United States Patent
Enomoto et al.

(10) Patent No.: US 6,208,471 B1
(45) Date of Patent: Mar. 27, 2001

(54) ZOOM LENS SYSTEM

(75) Inventors: Takashi Enomoto, Chiba; Takayuki Ito; Shuji Yoneyama, both of Saitama, all of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/274,650

(22) Filed: Mar. 23, 1999

(30) Foreign Application Priority Data

Apr. 17, 1998 (JP) .................................. 10-107966

(51) Int. Cl.⁷ .................................................. G02B 15/14
(52) U.S. Cl. .................................................. 359/692
(58) Field of Search ............................... 359/692

(56) References Cited

U.S. PATENT DOCUMENTS 5,126,884 * 6/1992 Sato ....................................... 359/692
5,844,725 * 12/1998 Itoh ....................................... 359/692
5,986,821 * 11/1999 Yoon ..................................... 359/692

* cited by examiner

Primary Examiner—Georgia Epps
Assistant Examiner—Evelyn A. Lester
(74) Attorney, Agent, or Firm—Greenblum & Bernstein, P.L.C.

(57) ABSTRACT

A zoom lens system having a positive first lens group and a negative second lens group in this order from the object side, wherein zooming is performed by varying the distance between the first and the second lens groups. The zoom lens system satisfies the following conditions (1) and (2):

$$1.4 < f_w/f_{1G} < 1.7 \tag{1}$$

$$0.85 < \Sigma_{d1G}/f_w < 1.1 \tag{2}$$

wherein: $f_w$ designates the focal length of the zoom lens system at the short focal length extremity; and $f_{1G}$ designates the focal length of the positive first lens group; and $\Sigma_{d1G}$ designates the thickness of the positive first lens group.

6 Claims, 8 Drawing Sheets

SPHERICAL ABERRATION
CHROMATIC ABERRATION

Fig. 2B

LATERAL CHROMATIC ABERRATION

Fig. 2C

ASTIGMATISM

Fig. 2D

DISTORTION

Fig. 3A

FNO= 3.9

— d Line
····· g Line
— — C Line

SPHERICAL
ABERRATION

CHROMATIC
ABERRATION

LATERAL
CHROMATIC
ABERRATION

ASTIGMATISM

DISTORTION

Fig. 4A

FNO= 5.6

— d Line
····· g Line
— — C Line

SPHERICAL
ABERRATION

CHROMATIC
ABERRATION

LATERAL
CHROMATIC
ABERRATION

ASTIGMATISM

DISTORTION

Fig. 5

Fig. 6A — FNO= 4.0 — SPHERICAL ABERRATION / CHROMATIC ABERRATION — d Line, g Line, C Line — −0.5 to 0.5

Fig. 6B — W= 36.0° — LATERAL CHROMATIC ABERRATION — −0.05 to 0.05

Fig. 6C — W= 36.0° — ASTIGMATISM — S, M — −0.5 to 0.5

Fig. 6D — W= 36.0° — DISTORTION — −5.0 % 5.0

SPHERICAL      LATERAL         ASTIGMATISM      DISTORTION
ABERRATION     CHROMATIC
               ABERRATION
CHROMATIC
ABERRATION

ZOOM LENS SYSTEM

BACKGROUND OF THE INVENTION

1. Field of the Invention

The present invention relates to a zoom lens system, in particular, to a zoom lens system for a medium-format camera in which the diagonal length (2y) of the format is more than 60 mm, and having a finder optical system and a photographing optical system being separately provided.

2. Description of the Related Art

In a zoom lens system for a compact camera in which a finder optical system and a photographing optical system are separately provided, there is no need to have a long back focal distance unlike in a zoom lens system for a single lens reflex (SLR) camera. Accordingly, a compact camera generally employs a telephoto type lens system in which positive and negative lens groups are provided in this order from the object side, while a retrofocus type lens system is generally employed in a SLR camera.

In a telephoto type two-lens-group zoom lens system, distribution of power over the front and the rear lens groups is an important factor to reduce aberrations and to make a camera compact. Furthermore, in order to reduce aberration fluctuations upon zooming, correction of aberrations at each lens group is required. However, it has been difficult to correct aberrations in a zoom lens system in which the half angle-of-view at the short focal length extremity is about 35°, and the zoom ratio is about 1.7, and the F-number at the long focal length extremity is 6.7 or less.

SUMMARY OF THE INVENTION

The object of the present invention is to provide a zoom lens system which attains a half angle-of-view of about 35° at the short focal length extremity, a zoom ratio of about 1.7, and an F-number of 6.7 or less at the long focal length extremity, while the zoom lens system well corrects aberration fluctuations upon zooming by correcting aberrations at each lens group, wherein the entire lens system is made compact.

In order to achieve the above-mentioned object, according to the present invention, there is provided a zoom lens system having a positive first lens group and a negative second lens group in this order from the object side, and zooming is performed by varying the distance between the first and the second lens groups. The zoom lens system satisfies the following conditions (1) and (2):

$$1.4 < f_w / f_{1G} < 1.7 \quad (1)$$

$$0.85 < \Sigma_{d1G} / f_w < 1.1 \quad (2)$$

wherein:

$f_w$ designates the focal length of the zoom lens system at the short focal length extremity;

$f_{1G}$ designates the focal length of the positive first lens group;

$\Sigma_{d1G}$ designates the thickness of the positive first lens group.

In the first positive lens group, the first lens element closest to the object is preferably formed as a negative lens element, and the positive first lens group satisfies the following condition (3):

$$-1 < f_{1G} / f_{1P} < -0.6 \quad (3)$$

wherein:

$f_{1P}$ designates the focal length of the negative first lens element of the positive first lens group.

The present disclosure relates to subject matter contained in Japanese Patent Application No. 10-107966 (filed on Apr. 17, 1998) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENTS

Figure 13:
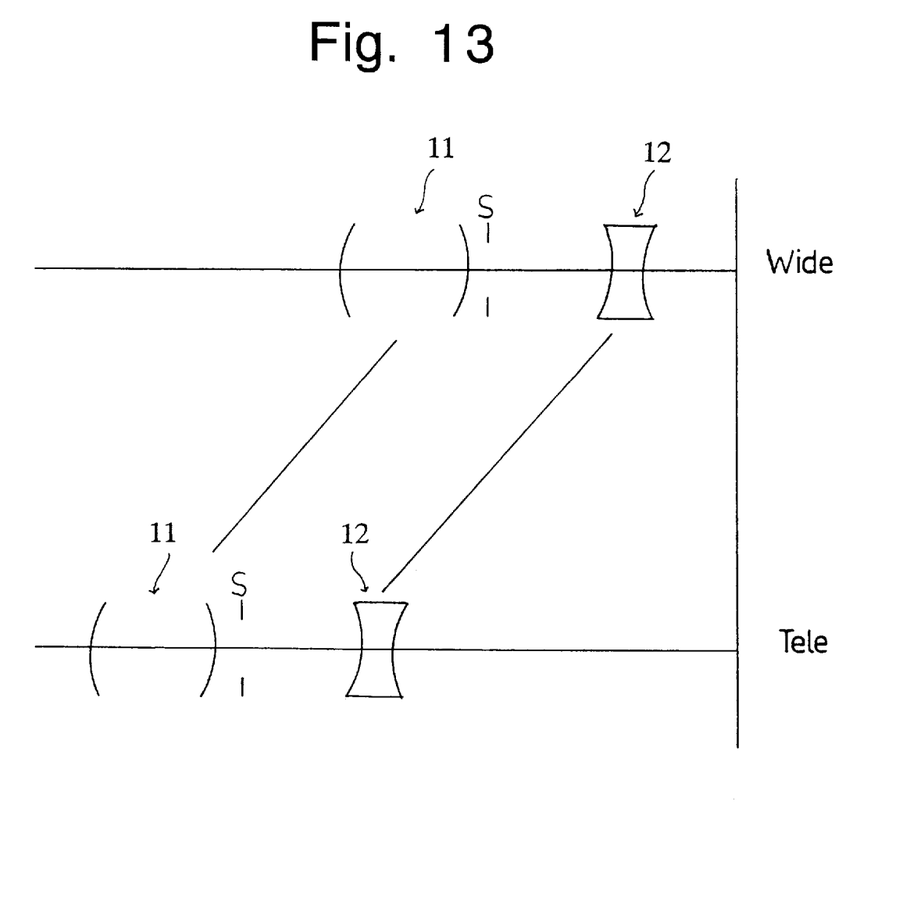
FIG. 13 is a diagram of the lens-group traveling paths the of the zoom lens system according to the first and second embodiments of the present invention.
Figure 14:
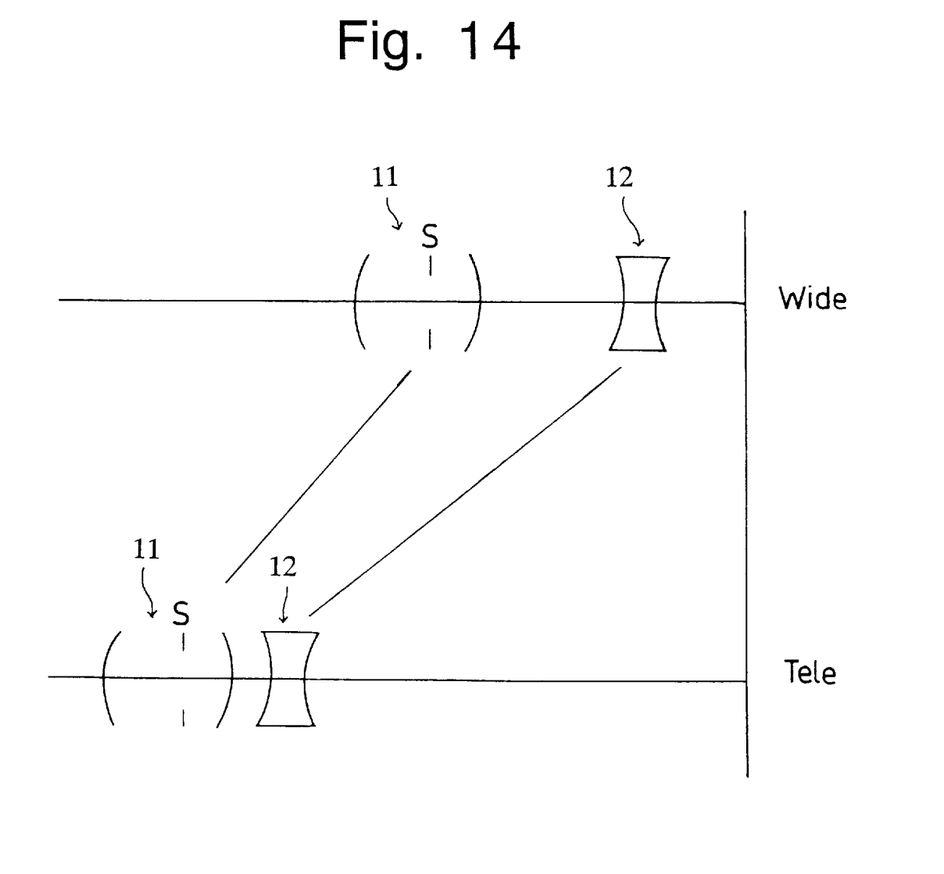
FIG. 14 is a diagram of the lens-group traveling paths the of the zoom lens system according to the third embodiment of the present invention.

The zoom lens system discussed herein is a telephoto-type zoom lens system in which the distance between a positive first lens group 11 and a negative second lens group 12 arranged in this order from the object side, is varied for zooming. According to the traveling paths of the positive first lens group 11 and the negative second lens group 12 indicated in FIGS. 13 and 14, when zooming is performed from the short focal length extremity toward the long focal length extremity, the positive first lens group 11 and the negative second lens group 12 move together while the distance therebetween is reduced. A Diaphragm S is positioned between the positive first lens group 11 and negative second lens group 12 (FIG. 13), or within the positive first lens group 11 (FIG. 14) so that the diaphragm S moves together with the positive first lens group 11. On the other hand, focusing can be performed by advancing either the positive first lens group 11 or the negative second lens group 12, or by advancing both the positive first and negative second lens group 11 and 12.

The condition (1) relates to the power of the positive first lens group 11. When the condition (1) is satisfied, the traveling distance of the positive first lens group 11 is reduced, the entire zoom lens system can be made compact, and at the same time, aberrations generated in the positive first lens group 11 can be corrected properly. In particular, it should be understood that in order to reduce aberration fluctuations upon zooming, the correcting of aberration at each lens group is an important factor for a medium-format compact camera in which the diagonal length (2y) of the format is more than 60 mm, and the F-number is about 6.7.

If $f_w/f_{1G}$ exceeds the upper limit, aberrations in the positive first lens group 11 become larger, so that aberration fluctuations upon zooming are not adequately corrected. If $f_w/f_{1G}$ exceeds the lower limit, the traveling distance of the positive first lens group 11 upon zooming becomes longer, so that the entire zoom lens system can not be made compact.

The condition (2) relates to the thickness of the positive first lens group 11. When the condition (2) is satisfied, aberrations in the positive first lens group 11 are properly corrected, and the entire zoom lens system can be made compact. If the positive first lens group 11 becomes thicker to the extent that $\Sigma_{d1G}/f_w$ exceeds the upper limit, the entire zoom lens system can not be made compact. If $\Sigma_{d1G}/f_w$ exceeds the lower limit, aberrations in the positive first lens group 11 can not fully be corrected.

Furthermore, if the half angle-of-view at the short focal length extremity is required to be more than 35° while the diameter of the lens element (of the positive first lens group 11) closest to the object is required to be smaller, the first lens element is preferably a negative lens element.

The condition (3) relates to a case in which the first lens element of the positive first lens group 11 is formed as a negative lens element. When the condition (3) is satisfied, the half angle-of-view at the short focal length extremity becomes more than 35° while aberrations in the positive first lens group 11 are properly corrected.

If $f_{1G}/f_{1P}$ exceeds the upper limit, the half-angle-of-view of more than 35° at the short focal length extremity with the smaller diameter of the first lens element can not be attained. If $f_{1G}/f_{1P}$ exceeds the lower limit, the power of the negative first lens element becomes too strong, so that production of the lens element is difficult, and the correcting of aberrations in the positive first lens group is also difficult.

Specific numerical data of the embodiments will be described below via the tables and diagrams. In the diagrams of chromatic aberration (axial chromatic aberration) represented by spherical aberrations, the solid lines and the two types of dotted lines respectively indicate chromatic aberrations with respect to the d, g and C lines. Also, in the diagrams of lateral chromatic aberration, the solid lines and the two types of dotted lines respectively indicate lateral chromatic aberrations with respect to the d, g and C lines. S designates the sagittal image, and M designates the meridional image. FNO designates the F-number, f designates the focal length of the entire zoom lens system, W designates the half angle-of-view, and $f_B$ designates the back focal distance. R designates the radius of curvature of each lens surface, D designates the lens thickness or distance, $N_d$ designates refractive index with respect to the d-line, $v_d$ designates the Abbe number with respect to the d-line.

In addition to the above, an aspherical surface which is symmetrical with respect to the optical axis is defined as follows:

$$x=Ch^2/\{1+[1-(1+K)C^2h^2]^{1/2}\}=A4h^4+A6h^6+A8h^8+A10h^{10};$$

wherein:

x designates a distance from a tangent plane of an aspherical vertex;

C designates a curvature of the aspherical vertex (1/r);

h designates a distance from the optical axis;

K designates the conic coefficient; and

A4 designates a fourth-order aspherical coefficient;

A6 designates a sixth-order aspherical coefficient;

A8 designates a eighth-order aspherical coefficient;

A10 designates a tenth-order aspherical coefficient.

[Embodiment 1]

Figure 1:
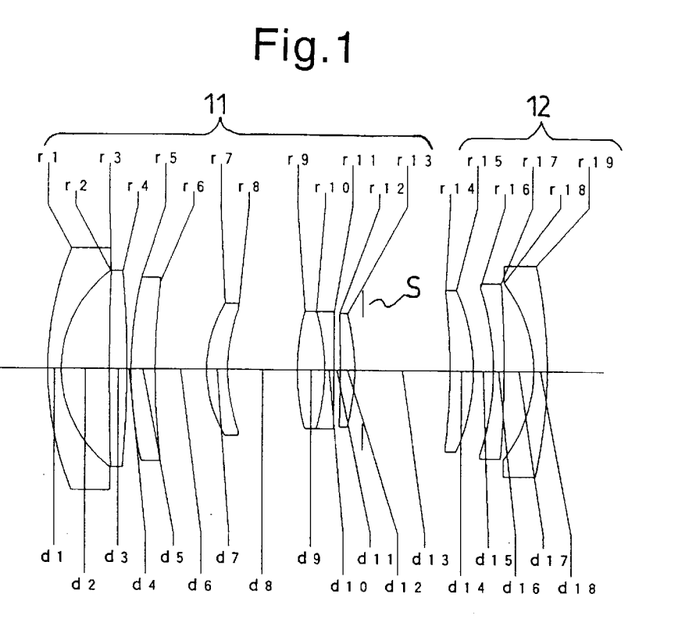
FIG. 1 is a lens arrangement of the first embodiment of a zoom lens system according to the present invention.
Figures 2A, 2B:
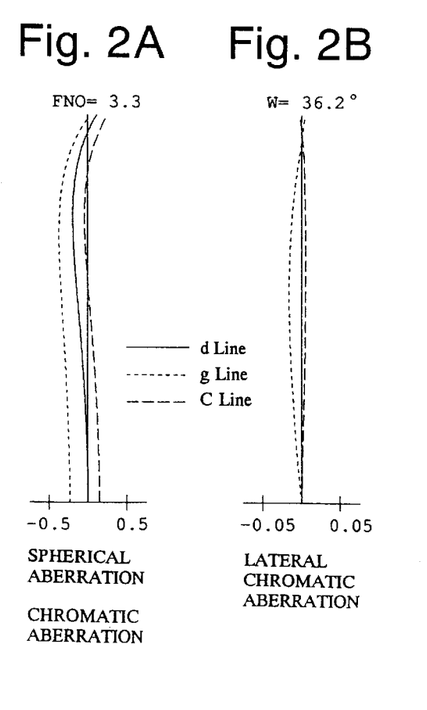
FIGS. 2A, 2B, 2C and 2D are aberration diagrams of the lens arrangement of FIG. 1 at the short focal length extremity.
Figure 2C:
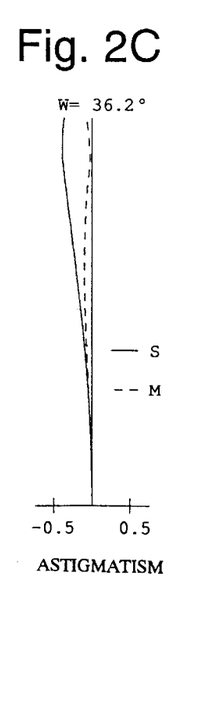
Figure 2D:
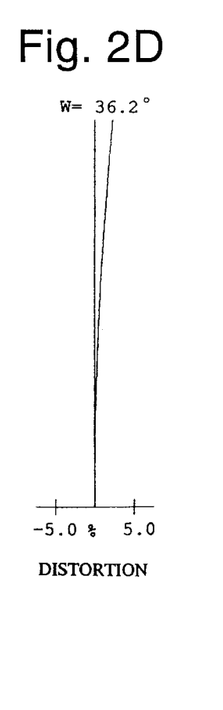
Figures 3A, 3B:
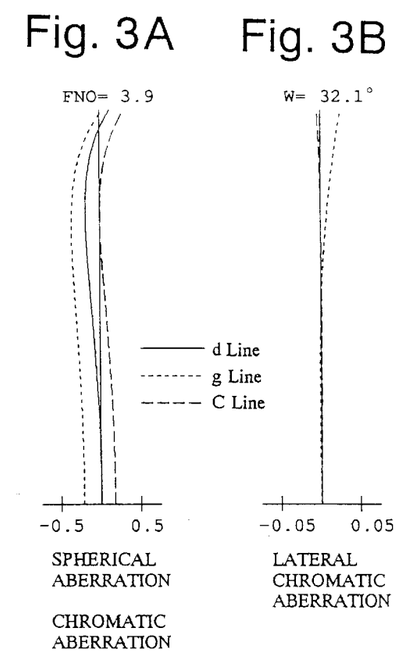
FIGS. 3A, 3B, 3C and 3D are aberration diagrams of the lens arrangement of FIG. 1 at a medium focal-length position.
Figure 3C:
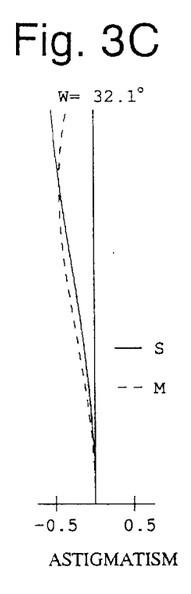
Figure 3D:
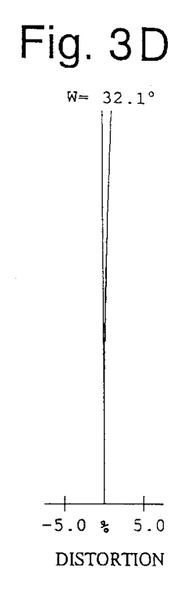
Figures 4A, 4B:
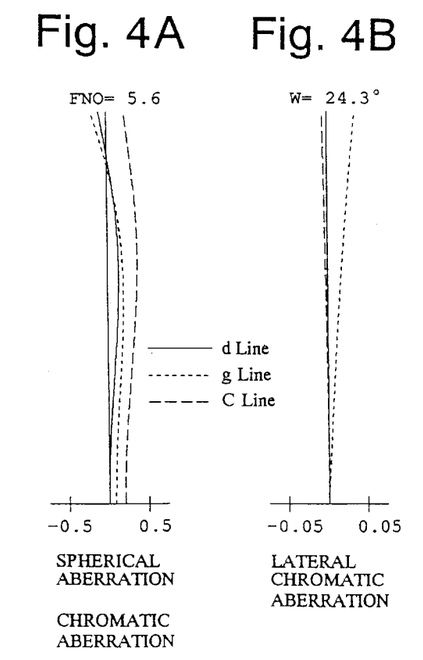
FIGS. 4A, 4B, 4C and 4D are aberration diagrams of the lens arrangement of FIG. 1 at the long focal length extremity.
Figure 4C:
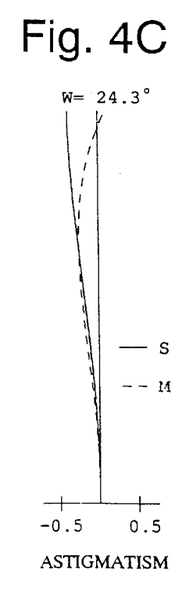
Figure 4D:
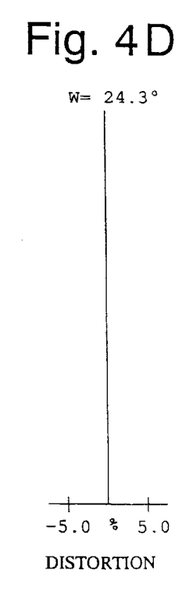

FIG. 1 indicates the lens arrangement of the first embodiment of the zoom lens system. FIGS. 2A, 2B, 2C and 2D, FIGS. 3A, 3B, 3C and 3D, and FIGS. 4A, 4B, 4C and 4D respectively show aberration diagrams of the zoom lens system at the short focal length extremity, a medium focal-length position, and the long focal length extremity. Table 1 shows the numerical data of this embodiment. Surfaces No. 1 to 13 designate the positive first lens group 11, and surfaces No. 14 to 19 designate the negative second lens group 12. It should be noted that the lens element (surfaces No. 1 and 2) closest to the object is a negative lens element. The diaphragm S is located behind the positive first lens group 11 (behind the surface No. 13), and is arranged to move together with the first lens group 11 (refer to FIG. 13).

TABLE 1

$F_{NO} = 1:3.3-3.9-5.6$
f = 46.60–55.00–77.20 (zoom ratio: 1.66)
W = 36.2°–32.1°–24.3°
$f_B$ = 18.53–29.47–58.39

| Surface No. | R | D | $N_d$ | $v_d$ |
|---|---|---|---|---|
| 1 | 48.740 | 2.00 | 1.73868 | 54.4 |
| 2 | 18.772 | 7.22 | — | — |
| 3 | 500.000 | 2.60 | 1.49000 | 69.8 |
| 4 | −170.000 | 0.61 | — | — |
| 5 | 62.869 | 3.60 | 1.56696 | 41.6 |
| 6 | 109.928 | 7.71 | — | — |
| 7 | 19.579 | 3.20 | 1.62040 | 43.7 |
| 8 | 27.438 | 10.46 | — | — |
| 9 | 36.724 | 4.12 | 1.51633 | 64.1 |
| 10 | −32.458 | 1.40 | 1.80518 | 25.4 |
| 11 | 1184.906 | 1.00 | — | — |
| 12 | −331.025 | 2.20 | 1.73077 | 40.5 |
| 13* | −31.207 | 1.20 | — | — |
| S | ∞ | 13.36–8.98–2.00 | — | — |
| 14 | −104.024 | 3.60 | 1.61584 | 36.6 |
| 15 | −30.487 | 3.07 | — | — |
| 16 | −40.798 | 1.60 | 1.78000 | 51.9 |
| 17 | −196.213 | 4.52 | — | — |
| 18 | −22.218 | 2.00 | 1.77250 | 49.6 |
| 19 | −78.521 | — | — | — |

| Surface No. | K | A4 | A6 | A8 |
|---|---|---|---|---|
| 13 | 0.00 | $0.1594 \times 10^{-4}$ | $0.1684 \times 10^{-7}$ | $0.1003 \times 10^{-9}$ |

TABLE 1-continued $F_{NO}$ = 1:3.3–3.9–5.6
f = 46.60–55.00–77.20 (zoom ratio: 1.66)
W = 36.2°–32.1°–24.3°
$f_B$ = 18.53–29.47–58.39

| Surface No. | R | D | $N_d$ | $v_d$ |
|---|---|---|---|---|

*designates the aspherical surface which is symmetrical with respect to the optical axis.
Aspherical surface data (the aspherical surface coefficients not indicated are zero (0.00)):

[Embodiment 2]

Figure 5:
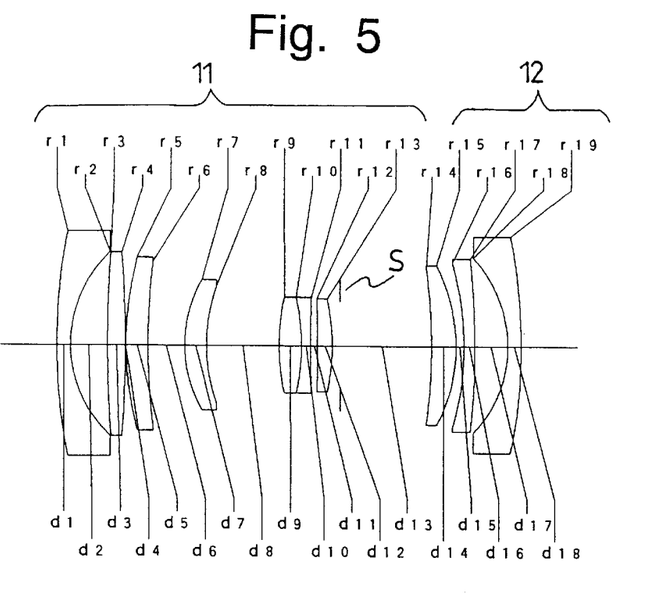
FIG. 5 is a lens arrangement of the second embodiment of a zoom lens system according to the present invention.
Figures 6A, 6B:
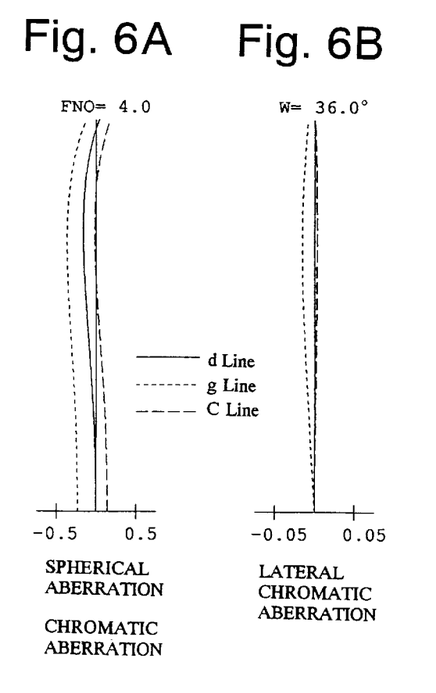
FIGS. 6A, 6B, 6C and 6D are aberration diagrams of the lens arrangement of FIG. 5 at the short focal length extremity.
Figure 6C:
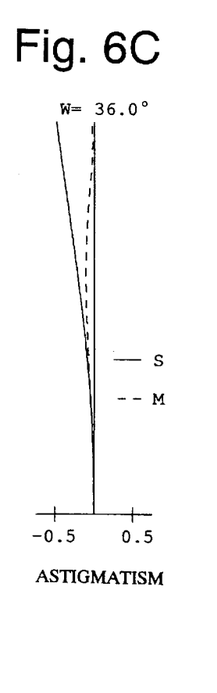
Figure 6D:
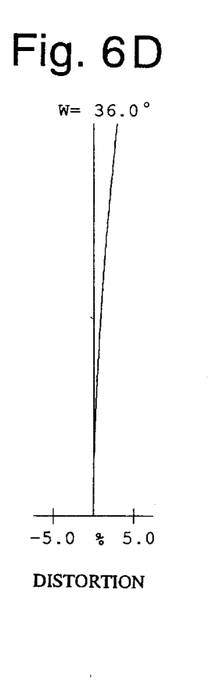
Figure 7A:
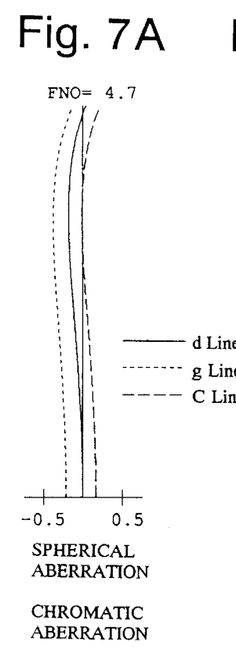
FIGS. 7A, 7B, 7C and 7D are aberration diagrams of the lens arrangement of FIG. 5 at a medium focal-length position.
Figure 7B:
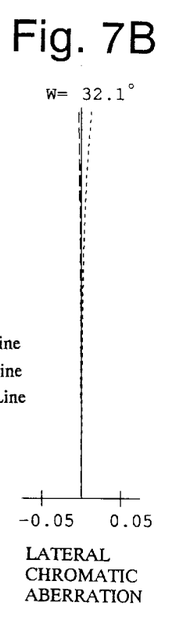
Figure 7C:
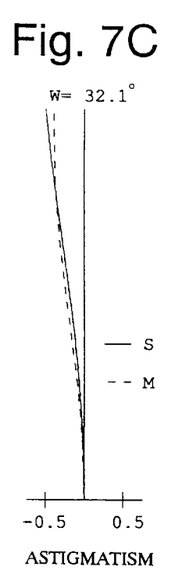
Figure 7D:
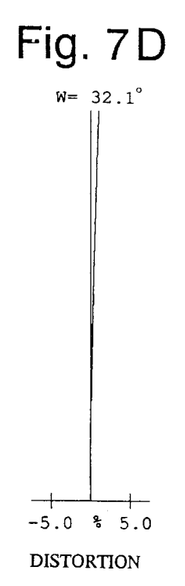
Figure 8A:
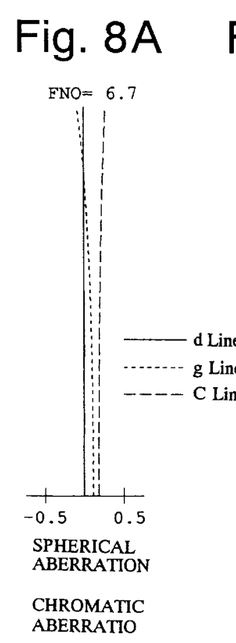
FIGS. 8A, 8B, 8C and 8D are aberration diagrams of the lens arrangement of FIG. 5 at the long focal length extremity.
Figure 8B:
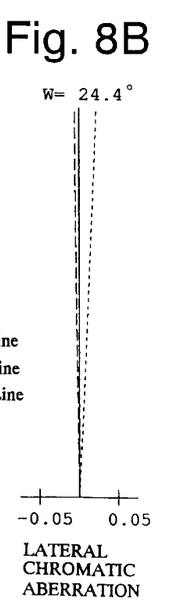
Figure 8C:
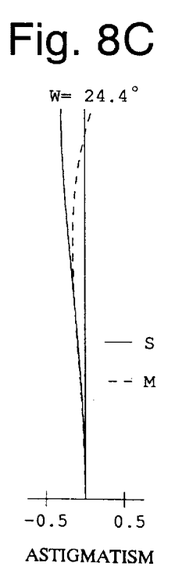
Figure 8D:
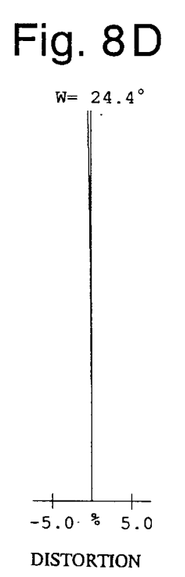

FIG. 5 indicates the lens arrangement of the second embodiment of the zoom lens system. FIGS. 6A, 6B, 6C and 6D, FIGS. 7A, 7B, 7C and 7D, and FIGS. 8A, 8B, 8C and 8D respectively show aberration diagrams of the zoom lens system at the short focal length extremity, a medium focal-length position, and the long focal length extremity. Table 2 shows the numerical data of this embodiment. The lens arrangement is the same as that of the first embodiment.

TABLE 2

$F_{NO}$ = 1:4.0–4.7–6.7
f = 46.60–55.00–77.20 (zoom ratio: 1.66)
W = 36.0°–32.1°–24.4°
$f_B$ = 18.19–29.06–57.80

| Surface No. | R | D | $N_d$ | $v_d$ |
|---|---|---|---|---|
| 1 | 86.139 | 2.00 | 1.67462 | 56.3 |
| 2 | 18.750 | 5.45 | — | — |
| 3 | 183.470 | 2.60 | 1.4900 | 69.8 |
| 4 | −189.958 | 0.10 | — | — |
| 5 | 50.422 | 3.20 | 1.67869 | 50.4 |
| 6 | 100.237 | 5.38 | — | — |
| 7 | 19.345 | 3.20 | 1.67979 | 45.1 |
| 8 | 25.567 | 10.72 | — | — |
| 9 | 33.918 | 3.25 | 1.51633 | 64.1 |
| 10 | −34.653 | 1.40 | 1.80518 | 25.4 |
| 11 | 429.717 | 1.00 | — | — |
| 12 | −296.889 | 2.20 | 1.73077 | 40.5 |
| 13* | −30.123 | 1.20 | — | — |
| S | ∞ | 13.70–9.24–2.12 | — | — |
| 14 | −87.078 | 3.70 | 1.60000 | 38.5 |
| 15 | −25.061 | 1.22 | — | — |
| 16 | −42.796 | 1.60 | 1.78000 | 51.9 |
| 17 | −116.511 | 4.94 | — | — |
| 18 | −18.877 | 2.00 | 1.77250 | 49.6 |
| 19 | −79.612 | — | — | — |

| Surface No. | K | A4 | A6 | A8 |
|---|---|---|---|---|
| 13 | 0.00 | $0.1494 \times 10^{-4}$ | $0.3467 \times 10^{-7}$ | $0.7826 \times 10^{-10}$ |

*designates the aspherical surface which is symmetrical with respect to the optical axis.
Aspherical surface data (the aspherical surface coefficients not indicated are zero (0.00)):

[Embodiment 3]

Figure 9:
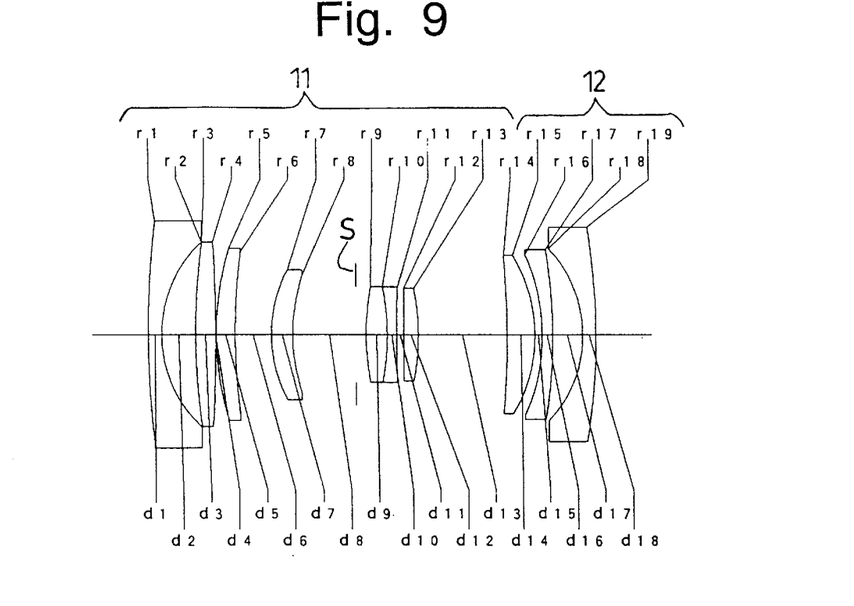
FIG. 9 is a lens arrangement of the third embodiment of a zoom lens system according to the present invention.
Figures 10A, 10B:
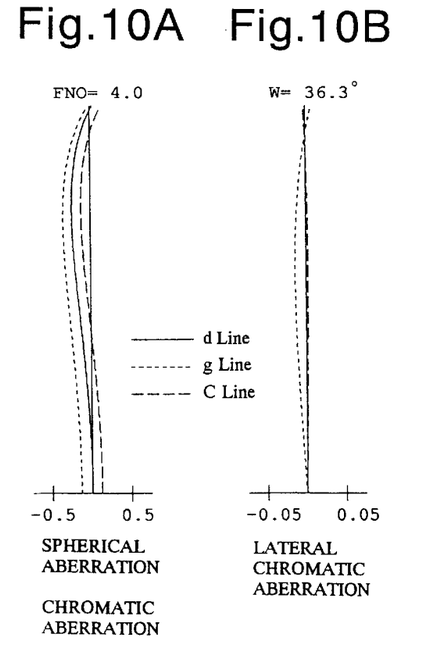
FIGS. 10A, 10B, 10C and 10D are aberration diagrams of the lens arrangement of FIG. 9 at the short focal-length extremity.
Figure 10C:
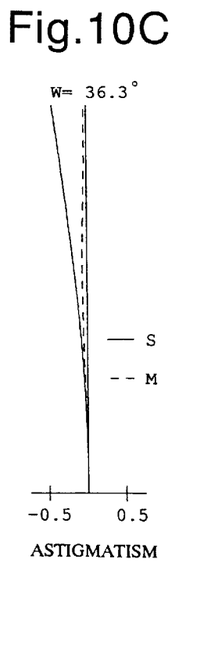
Figure 10D:
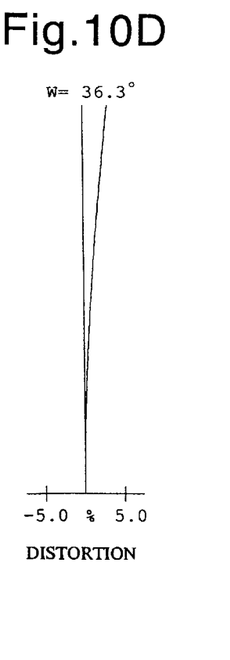
Figures 11A, 11B:
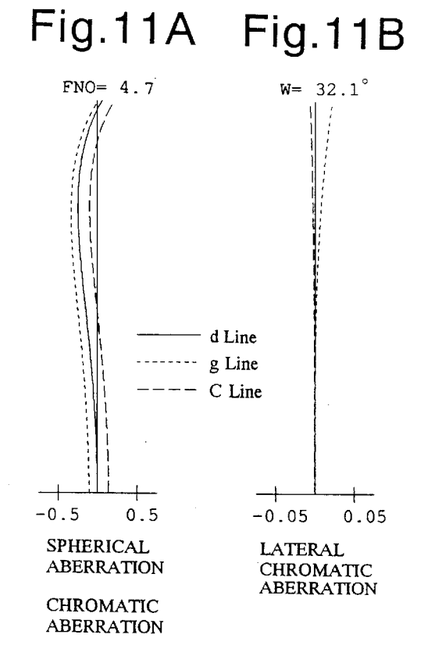
FIGS. 11A, 11B, 11C and 11D are aberration diagrams of the lens arrangement of FIG. 9 at a medium focal-length position.
Figure 11C:
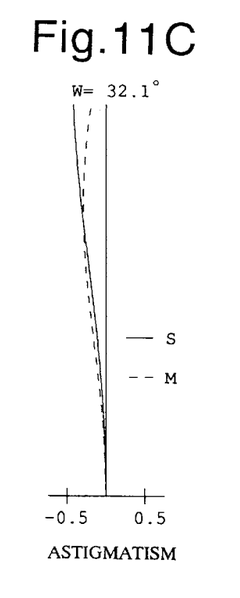
Figure 11D:
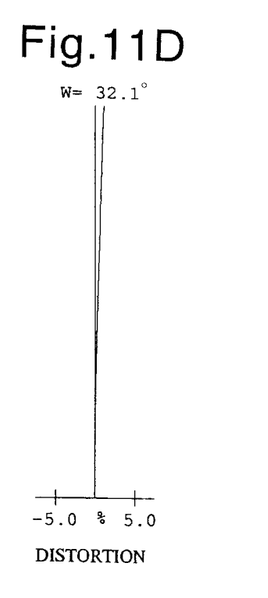
Figures 12A, 12B:
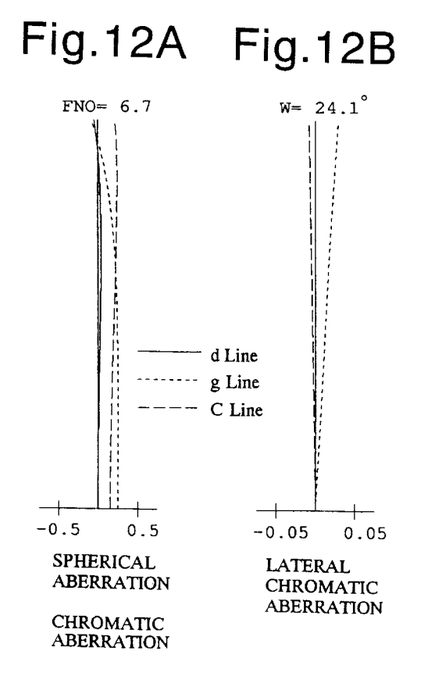
FIGS. 12A, 12B, 12C and 12D are aberration diagrams of the lens arrangement of FIG. 9 at the long focal length extremity.
Figure 12C:
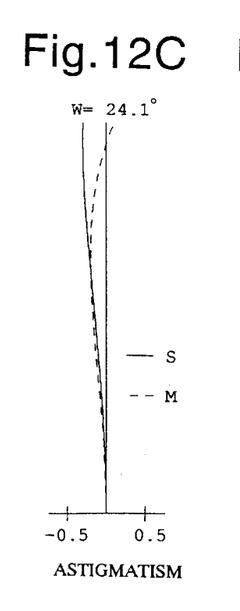
Figure 12D:
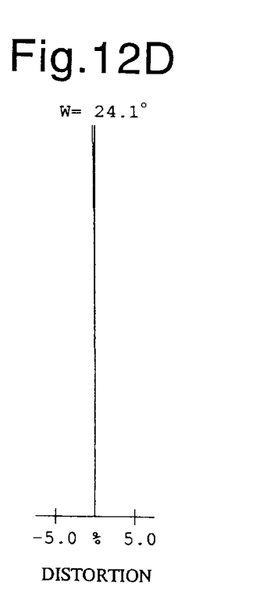

FIG. 9 indicates the lens arrangement of the third embodiment of the zoom lens system. FIGS. 10A, 10B, 10C and 10D, FIGS. 11A, 11B, 11C and 11D, and FIGS. 12A, 12B, 12C and 12D respectively show aberration diagrams of the zoom lens system (FIG. 9) at the short focal length extremity, the medium focal-length position, and the long focal length extremity. Table 3 shows the numerical data of this embodiment. The lens arrangement is the same as that of the first embodiment; however the diaphragm S is located within the positive first lens group 11 (between the surfaces No.8 and 9), and is arranged to move together with the positive first lens group 11 (refer to FIG. 14).

TABLE 3

$F_{NO}$ = 1:4.0–4.7–6.7
f = 46.00–55.00–78.00 (zoom ratio: 1.70)
W = 36.3°–32.1°–24.1°
$f_B$ = 17.68–28.51–56.18

| Surface No. | R | D | $N_d$ | $v_d$ |
|---|---|---|---|---|
| 1 | 145.229 | 2.00 | 1.58695 | 64.6 |
| 2 | 18.750 | 5.07 | — | — |
| 3 | 100.000 | 3.00 | 1.49000 | 69.8 |
| 4 | −223.666 | 0.10 | — | — |
| 5 | 43.878 | 2.80 | 1.51434 | 65.9 |
| 6 | 93.004 | 5.36 | — | — |
| 7 | 20.247 | 3.20 | 1.62195 | 49.2 |
| 8 | 27.408 | 9.39 | — | — |
| S | ∞ | 1.50 | — | — |
| 9 | 35.140 | 3.18 | 1.51633 | 64.1 |
| 10 | −33.981 | 1.40 | 1.80518 | 25.4 |
| 11 | 239.617 | 1.00 | — | — |
| 12 | 649.000 | 2.20 | 1.73077 | 40.5 |
| 13* | −30.650 | 13.45–9.30–3.05 | — | — |
| 14 | −120.844 | 4.23 | 1.60188 | 38.2 |
| 15 | −22.059 | 1.12 | — | — |
| 16 | −27.940 | 1.60 | 1.78000 | 51.9 |
| 17 | −72.435 | 4.53 | — | — |
| 18 | −18.321 | 2.00 | 1.77250 | 49.6 |
| 19 | −93.983 | — | — | — |

| Surface No. | K | A4 | A6 | A8 |
|---|---|---|---|---|
| 13 | 0.00 | $0.1267 \times 10^{-4}$ | $0.3698 \times 10^{-7}$ | $0.1141 \times 10^{-9}$ |

*designates the aspherical surface which is symmetrical with respect to the optical axis.
Aspherical surface data (the aspherical surface coefficients not indicated are zero (0.00)):

Table 4 shows the numerical data for each condition of the embodiments 1 through 3.

TABLE 4

| | Condition (1) | Condition (2) | Condition (3) |
|---|---|---|---|
| Embodiment 1 | 1.46 | 0.99 | −0.75 |
| Embodiment 2 | 1.44 | 0.87 | −0.90 |
| Embodiment 3 | 1.48 | 0.87 | −0.84 |

It is noted that each embodiment satisfies the conditions, and aberrations are well corrected.

As explained, the telephoto type two-lens-group zoom lens system can attain the half angle-of-view of about 35° at the short focal length extremity, a zoom ratio of about 1.7, and an F-number of about 6.7 at the long focal length extremity, while the entire zoom lens system can be made compact.

What is claimed is:

1. A zoom lens comprising a positive first lens group and a negative second lens group positioned in this order from the object side, wherein zooming is performed by varying the distance between said positive first lens group and said negative second lens group; said zoom lens system satisfying the following relationships:

$$1.4 < f_w/f_{1G} < 1.7$$

$$0.85 < \Sigma_{d1G}/f_w \leq 0.99$$

wherein:

$f_w$ designates the focal length of said zoom lens system at the short focal length extremity;

$f_{1G}$ designates the focal length of said positive first lens group; and $\Sigma_{d1G}$ designates the thickness of said positive first lens group.

2. The zoom lens system according to claim 1, wherein a first lens element of said positive first lens group is a negative lens element, and said zoom lens system satisfies the following condition:

$$-1 < f_{1G}/f_{1P} < -0.6$$

wherein $f_{1P}$ designates the focal length of said negative first lens element of said positive first lens group.

3. The zoom lens system according to claim 1, said system having a half angle of view of about 35° at the short focal length extremity, a zoom ratio of about 1.7 and an F-number equal to or less than 6.7 at the long focal length extremity.

4. A zoom lens system forming an image on an image plane with a diagonal of more than 60 mm, said zoom lens system comprising a positive first lens group and a negative second lens group positioned in this order from the object side, wherein zooming is performed by varying the distance between said positive first lens group and said negative second lens group said zoom lens system satisfying the following relationships:

$$1.4 < f_w/f_{1G} < 1.7$$

$$0.85 < \Sigma_{d1G}/f_w < 1.1$$

wherein:

$f_w$ designates the focal length of said zoom lens system at the short focal length extremity;

$f_{1G}$ designates the focal length of said positive first lens group; and $\Sigma_{d1G}$ designates the thickness of said positive first lens group.

5. The zoom lens system according to claim 4, wherein a first lens element of said positive first lens group is a negative lens element, and said zoom lens system satisfies the following relationship:

$$-1 < f_{1G}/f_{1P} < -0.6$$

wherein $f_{1P}$ designates the focal length of said negative first lens element of said positive first lens group.

6. The zoom lens system according to claim 4, said zoom lens system having a half angle of view of about 35° at the short focal length extremity, a zoom ratio of about 1.7 and an F-number equal to or less than 6.7 at the long focal length extremity.

* * * * *